United States Patent
Regev et al.

(10) Patent No.: US 6,993,623 B2
(45) Date of Patent: Jan. 31, 2006

(54) PARITY BIT SYSTEM FOR A CAM

(75) Inventors: Alon Regev, Woodland Hills, CA (US); Zvi Regev, West Hills, CA (US)

(73) Assignee: Micron Technology, Inc., Boise, ID (US)

( * ) Notice: Subject to any disclaimer, the term of this patent is extended or adjusted under 35 U.S.C. 154(b) by 414 days.

(21) Appl. No.: 10/325,739

(22) Filed: Dec. 23, 2002

(65) Prior Publication Data

US 2004/0123022 A1 Jun. 24, 2004

(51) Int. Cl.
  *G06F 12/00* (2006.01)
(52) U.S. Cl. .......................... 711/108; 714/52; 714/54; 714/701; 714/758; 714/800; 714/763
(58) Field of Classification Search ................ 711/108; 365/49; 714/52, 701, 758, 800, 54, 718, 714/719, 722, 763, 768, 773, 774, 801, 805; 370/363, 371, 374, 378, 379, 381, 382, 383, 370/395.7, 395.72
See application file for complete search history.

(56) References Cited

U.S. PATENT DOCUMENTS

| | | | | |
|---|---|---|---|---|
| 5,455,834 A | * | 10/1995 | Chang et al. | 714/768 |
| 6,067,656 A | * | 5/2000 | Rusu et al. | 714/768 |
| 2002/0126704 A1 | * | 9/2002 | Cam et al. | 370/503 |
| 2004/0083421 A1 | * | 4/2004 | Foss et al. | 714/805 |

* cited by examiner

*Primary Examiner*—Christian P. Chace
(74) *Attorney, Agent, or Firm*—Dickstein Shapiro Morin & Oshinky LLP (57) ABSTRACT

A CAM includes a parity bit system for error detection. In one embodiment, in each CAM cell, the data portion has its own data parity bit while the status portion has an independent status parity bit. The status parity bit is recalculated and updated whenever a status bit in the entry is changed. In another embodiment, each status bit is provided with a corresponding shadow status bit. Each status bit and its corresponding shadow status bit is always loaded with the same data. In this manner, every change 1-bit change to a status bit is made as two identical 1-bit changes to the status bit and its corresponding shadow status bit. The two identical 1-bit changes are parity neutral, thereby permitting status changes without requiring recomputing and saving a new parity.

36 Claims, 3 Drawing Sheets

PARITY BIT SYSTEM FOR A CAM

FIELD OF INVENTION

The present invention relates generally to semiconductor memory devices, and more particularly, a parity bit system suitable for use in a content addressable memory (CAM).

BACKGROUND OF THE INVENTION

An essential semiconductor device is semiconductor memory, such as a random access memory (RAM) device. A RAM allows a memory circuit to execute both read and write operations on its memory cells. Typical examples of RAM devices include dynamic random access memory (DRAM) and static random access memory (SRAM).

Another form of memory is the content addressable memory (CAM) device. A CAM is a memory device that accelerates any application requiring fast searches of a database, list, or pattern, such as in database machines, image or voice recognition, or computer and communication networks. CAMs provide benefits over other memory search algorithms by simultaneously comparing the desired information (e.g., data in the comparand register) against the entire list of pre-stored entries. As a result of their unique searching algorithm, CAM devices are frequently employed in network equipment (particularly routers and switches), computer systems, cache tags, and other devices that require rapid content searching.

In order to perform a memory search in the above-identified manner, CAMs are organized differently than other memory devices (e.g., DRAM and SRAM). For example, data is stored in a RAM in a particular location, called an address. During a memory access, the user supplies an address and reads into or gets back the data at the specified address.

In a CAM, however, data is stored in locations in a somewhat random fashion. The locations can be selected by an address bus, or the data can be written into the first empty memory location. Every location has a pair of status bits that keep track of whether the location is storing valid information in it or is empty and available for writing.

Once information is stored in a memory location, it is found by comparing every bit in memory with data in the comparand register. When the content stored in the CAM memory location does not match the data in the comparand register, the local match detection circuit returns a no match indication. When the content stored in the CAM memory location matches the data in the comparand register, the local match detection circuit returns a match indication. If one or more local match detect circuits return a match indication, the CAM device returns a "match" indication. Otherwise, the CAM device returns a "no-match" indication. In addition, the CAM may return the identification of the address location in which the desired data is stored or one of such addresses if more than one address contained matching data. Thus, with a CAM, the user supplies the data and gets back the address if there is a match found in memory.

As with other semiconductor memory devices, CAMs can be susceptible to "soft errors," where the data in the CAM is changing (or has changed) as a result of an unknown, or unpredictable event, such as a glitch. If the soft error is not detected, the data stored within the CAM will be incorrect and the application which relies upon the CAM will produce inaccurate results. In order to detect (and/or correct) soft errors, many memory systems incorporate parity bits. A parity bit is an additional bit appended to a memory word.

The use of a single parity bit appended to each data word permits the memory system to detect single bit errors. The content of the parity bit is determined by a mathematical operation upon the data portion of the word. In many systems using a single parity bit per word, the value of the parity bit may be the exclusive OR (XOR) of each data bit in the word. A memory system can detect a single-bit soft error in a memory word by calculating the parity and storing the parity during the write of a data word and recalculating the parity based on the data read during a read operation and comparing the calculated parity with the read parity. If the calculated parity matches the read parity, the memory system can conclude that the data word was read without any single bit errors.

In a CAM the use of parity bits is problematic because CAM entries store not only data, but also status bits. That is, each CAM entry has a number of bits which store the data contents of the CAM and an additional plurality of bits used to store status information regarding that CAM entry. For example, commonly available status bits include a valid bit (for indicating whether CAM entry contains valid data), a permanence bit (for indicating whether a CAM entry should be "locked" in the CAM), a read bit (for indicating whether a CAM entry matches a search expression), etc. Additionally, some CAM support user defined status bits. The existence of status bits in a CAM is problematic because the status bits associated with one or more CAM entries may be changed without a change in the data portion of the associated CAM entries. For example, a search operation performed upon the CAM may cause a read bit in one or more entries to be changed without changing the data stored in those entries. A change in one status bit of an entry is a single bit change which would ordinarily be detected as a parity error if that entry were to be read. Accordingly, there is a desire and need for a mechanism to permit the use of parity bits with a CAM memory system.

SUMMARY OF THE INVENTION

The present invention is directed to a CAM which includes a parity bit system for error detection. In one embodiment, in each CAM entry, the data portion has its own data parity bit while the status bit(s) portion has an independent status parity bit. The status parity bit is recalculated and updated whenever a status bit in the entry is changed. In this manner, changes to any status bit also causes a change to the status parity bit, thereby ensuring that the entry can be read correctly absent a soft error. In another embodiment, each status bit is provided with a corresponding shadow status bit. Each status bit and its corresponding shadow status bit is always loaded with the same data. In this manner, every change to a status bit results in two identical 1-bit changes in the CAM cell. The two identical 1-bit changes do not change the computed parity of the cell. Thus, even when the status of the data word stored in the CAM cell changes, the originally calculated parity is still valid.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
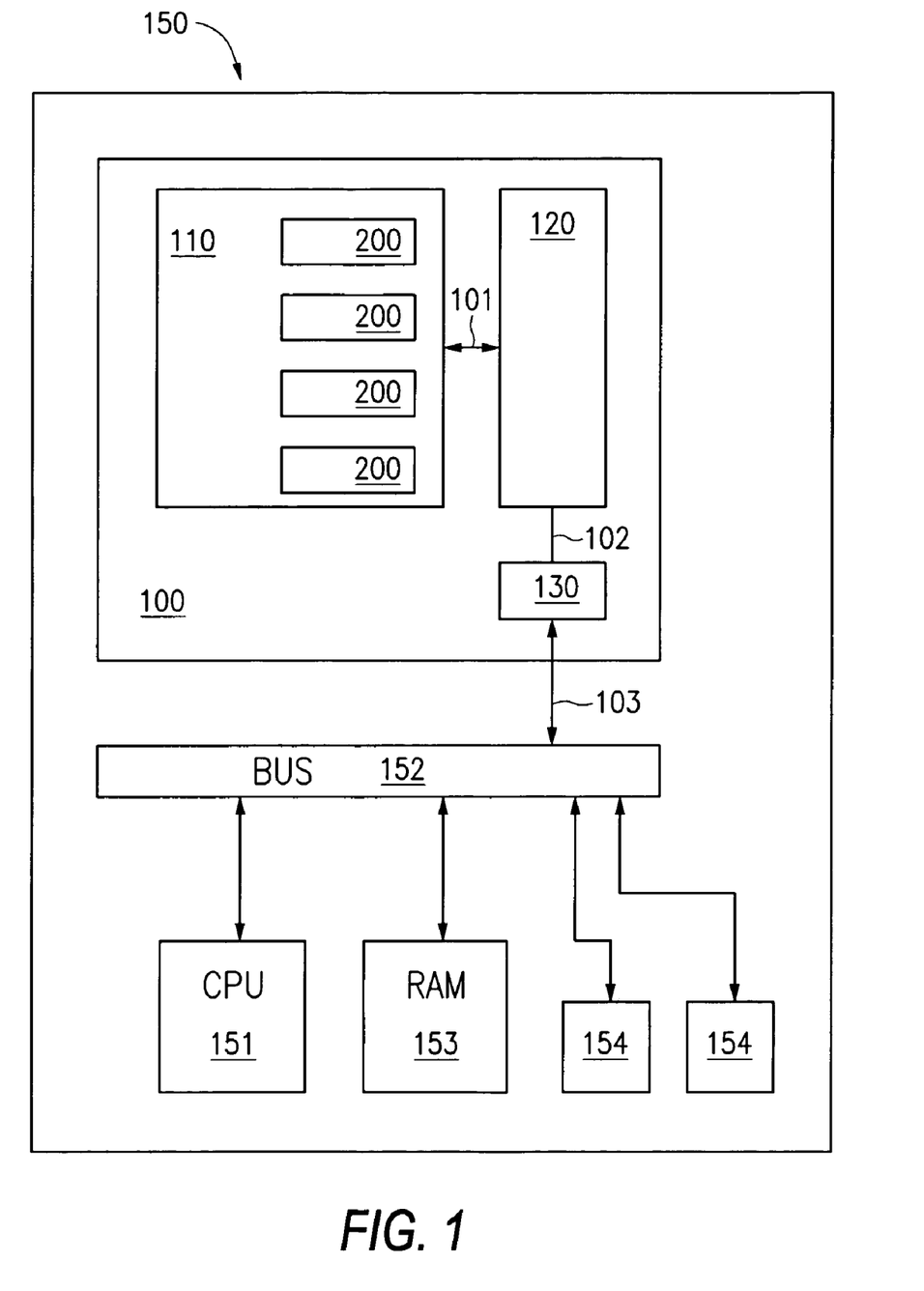
FIG. 1 is a block diagram of a processor based system, such as a network router, which includes a CAM memory device.

Now referring to the drawings, where like reference numerals designate like elements, there is shown in FIG. 1 a processor based system 150. The processor based system includes a CPU 151 which is coupled to a bus 152. Also coupled to the bus are a random access memory (RAM) 153, network interfaces 154, and a CAM memory device 100. The CAM memory device 100 includes a memory array 110 having a plurality of CAM entries 200. The data stored in the CAM device are stored in the CAM entries 200. Additionally, status information regarding the stored data are also stored in the CAM entries 200. The memory array 110 is coupled via a plurality of signal lines 101 to a controller 120, which is used to coordinate the reading, writing, searching, and other operations of the CAM memory device. The controller 120 is additionally coupled via a plurality of signal lines 102 to an I/O interface 130. The I/O interface 130 communicates with other devices via the bus 152 using a plurality of signal lines 103, which may include address, data, and control signal lines as known in the CAM memory art.

Figure 2:
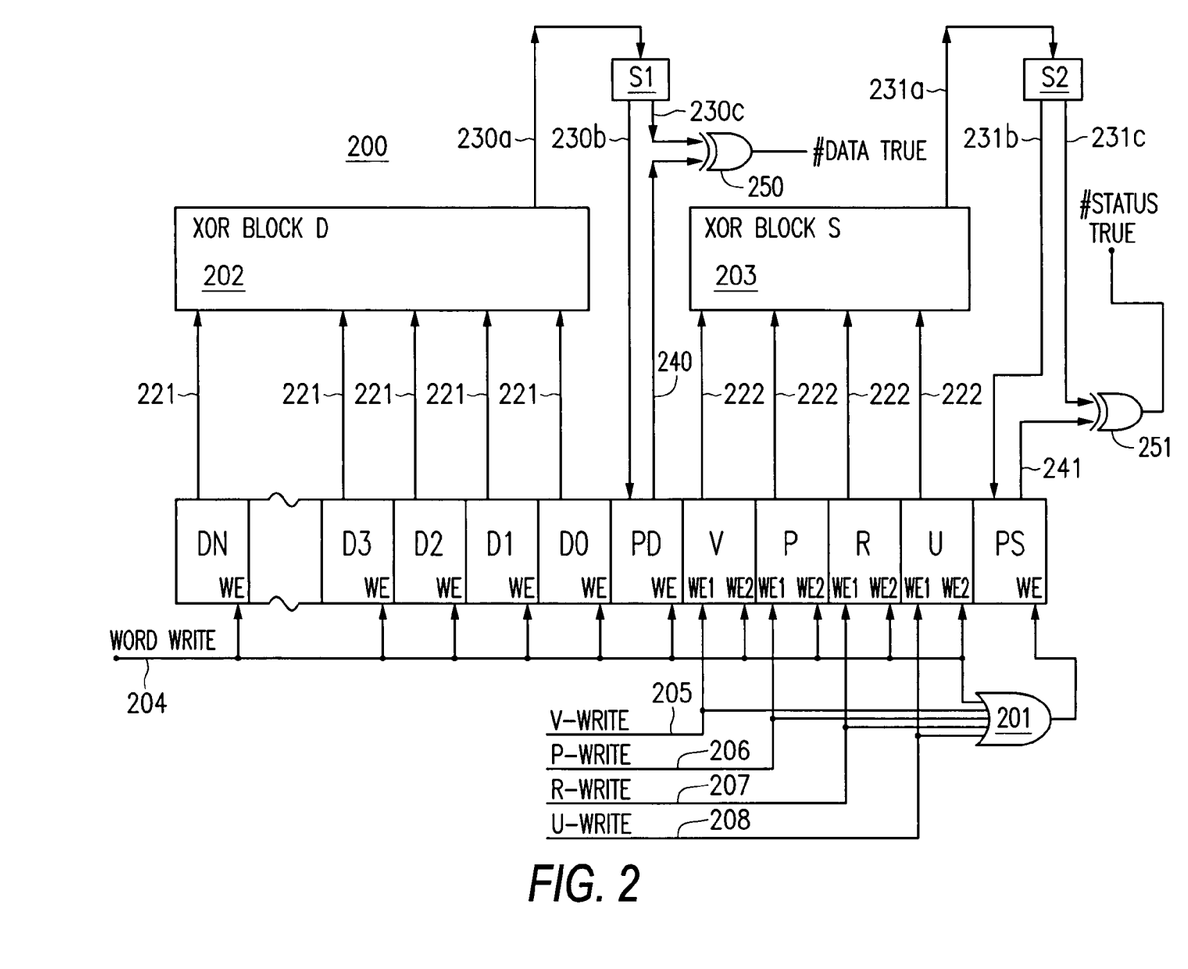
FIG. 2 is a block diagram of a CAM cell supporting parity in accordance with a first embodiment of the present invention.

FIG. 2 is a block diagram of a CAM entry 200 in accordance with the first embodiment of the present invention. The CAM entry includes a plurality of data cells (D0, D1, . . . , DN), a plurality of status cells (V, P, R, U), and two parity bits (PD, PS). Each data cell and each parity cell includes a single write enable terminal (WE), which when set to one logical state (e.g., logical high), will permit the respective cells to accept write data from a data line (not illustrated in order to avoid cluttering the figure). Similarly, when the write enable terminal WE is set to another logical state (e.g., logical low), the respective cells will not accept write data from the data line. Each status cell includes two write enable terminals WE1, WE2 and one or more data line connections. When either write enable terminals WE1, WE2 are set to the first logical state, the status cell will be written with the data from the one of the data lines. When both write enable terminals WE1, WE2 are set to the other logical state (e.g., logical low), the respective status cell will not accept write data from the data line.

The outputs of the data cells (D0, D1, . . . , DN) are provided on output lines 221 and supplied to the XOR Block D circuit 202, which computes the exclusive OR function on each of its inputs 221 and provides an output corresponding to the parity of the data cells (D0, D1, . . . , DN) on output line 230a. The switch S1 is used to selectively couple line 230a to either line 230b or line 230c. On writes, the switch S1 couples line 230a to line 230b so that the computed parity on line 230a can be written into the data parity (PD) cell. The write enable terminal WE of the parity data cell is coupled to the WORD WRITE control line 204. Thus, the data parity is computed and written into the data parity cell (PD) each time the data cells (D0, D1, . . . , DN) of the CAM cell 200 is changed (i.e., written). On reads, the switch S1 couples line 230a to line 230c, which supplies the computed parity on line 230a as an input to an exclusive OR (XOR) gate 250. The other input of the XOR gate 250 is the output of the data parity (PD) cell. The XOR gate 250 is used to compute #DATA TRUE, which is set to a logical low state only if line 230c and line 240 are at the same logical state (i.e., the computed parity matches the stored parity). Thus, the XOR gate 250 can be used to detect errors in the data portion of the CAM cell during read operations.

The outputs of the status cells (V, P, R, U) are provided on output lines 222 and supplied to the XOR Block S circuit 203, which computes the exclusive OR function on each of its inputs 222 and provides an output corresponding to the parity of the status cells (V, P, R, U) on output line 231a. The switch S2 operates in a similar manner as switch S1. On writes, the switch S2 couples line 231a to line 231b so that the computed parity on line 230a can be written into the data parity (PD) cell. The write enable terminal WE of the parity status cell is coupled to the output of OR gate 201, which accepts as its inputs the each of the write enables lines of the CAM cells (i.e., write enable lines 204, 205, 206, 207, and 208). Thus, the status parity is computed and written into the status parity (PS) cell each time the data portion or the status portion of the CAM cell is written. (Alternatively, by not supplying the WORD WRITE control line 204 as an input line to the OR gate 201, the status parity cell is would only be written when one of the status cells is written). On reads, the switch S2 couples line 231a to line 231c, which supplies the computed parity on line 230a as an input to an exclusive OR (XOR) gate 251. The other input of the XOR gate 251 is the output of the status parity (PS) cell. The XOR gate 251 is used to compute #STATUS TRUE, which is set to a logical low state only if line 230c and line 240 are at the same logical state (i.e., the computed parity matches the stored parity). Thus, the XOR gate 251 can be used to detect errors in the status portion of the CAM cell during read operations.

One variation of this first embodiment utilizes a single parity bit instead of separate data parity (PD) and status parity (PS) bits. That is, the data parity cell (PD) and its associated circuitry (i.e., XOR Block D 202, switch S1, lines 230a, 230b, 230c, and XOR gate 250) would be deleted and the circuitry associated with the status parity cell (PS) (e.g., XOR Block S 203) would be extended to compute a parity computation across the data (D0, D1, . . . , DN) and status (V, P, R, U) and to store a new parity in the status parity cell (PS) each time either the data or status is written by controlling, for example, the WE terminal of the parity cell (PS) using gate 201.

Figure 3:
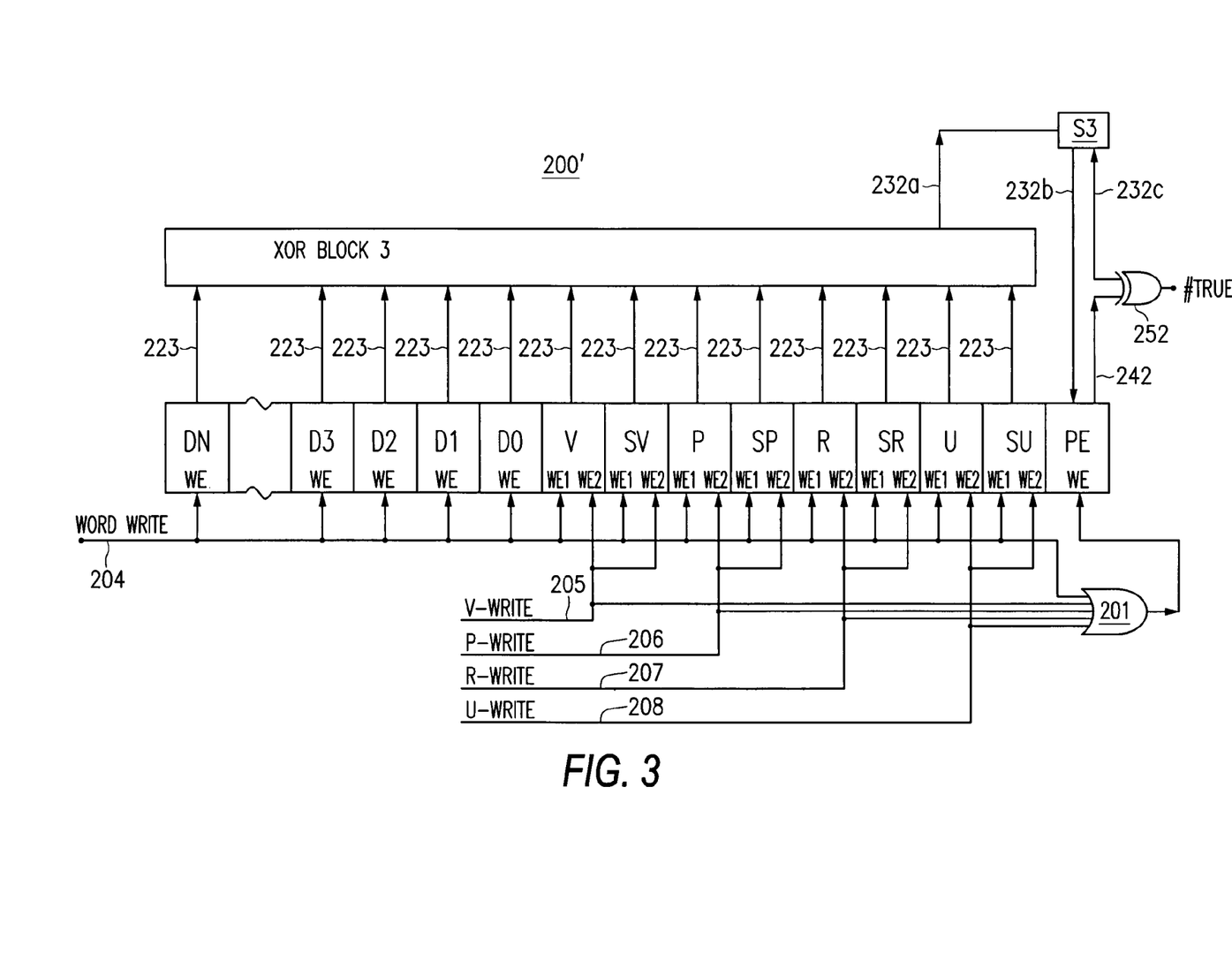
FIG. 3 is a block diagram of a CAM cell supporting parity in accordance with a second embodiment of the present invention.

FIG. 3 is a block diagram of a CAM cell 300 in accordance with the second embodiment of the present invention. The CAM cell includes a plurality of data cells (D0, D1, . . . , DN), a plurality of status cells (V, P, R, U), a plurality of shadow status cells (SV, SP, SR, and SU), and a single parity bit (PE). Each data cell and the parity cell includes a single write enable terminal (WE), which when set to one logical state (e.g., logical high), will permit the respective cells to accept write data from a data line (not illustrated in order to avoid cluttering the figure). Similarly, when the write enable terminal WE is set to another logical state (e.g., logical low), the respective cells will not accept write data from the data line. Each status and shadow status cell includes two write enable terminals WE1, WE2. When either write enable terminals WE1, WE2 are set to the first logical state, the status cell will be written with the data from the data line. When both write enable terminals WE1, WE2 are set to the other logical state (e.g., logical low), the respective status cell will not accept write data from the data line. Each shadow status cell (SV, SP, SR, and SU) has its data input terminal set up to receive the same information as supplied to the data input terminal of its respective status cells (V, P, R, U).

PARA0The outputs of the data cells (D0, D1, . . . , DN), status cells (V, P, R, U), and shadow status cells (SV, SP, SR, SU) are provided on output lines 223 and supplied to the XOR Block 3 circuit 202, which computes the exclusive OR function on each of its inputs 223 and provides an output corresponding to the parity of the data cells (D0, D1, . . . , DN), status cells (V, P, R, U), and shadow status cells (SV, SP, SR, SU) on output line 232a. Switch S3 is used to selectively couple line 232a to either line 232b or line 232c. During a write operation, switch S3 is set so that line 232a is coupled to line 232b, so that the computed parity is stored in the parity cell (PE). During a read operation, switch S3 is set so that line 232a is coupled to line 232c, so that the computed parity is supplied as an input to the exclusive OR (XOR) gate 252. The other input of the XOR gate 252 is from line 242, which outputs the content of the parity cell (PE). The output of the XOR gate 252, #TRUE, is set to a low logical state only when computed parity matches the stored parity. Thus, the XOR gate 252 can be used to detect parity errors in the CAM entry 200'.

PARA0As shown in FIG. 3, the WORD WRITE control line 204 is coupled to each of the cells (D0, D1, . . . , DN, V, P, R, U, SV, VP, SR, SU) and the status bit write lines are respectively coupled to the write enable terminal of the corresponding status bit as well as the write enable terminal of the corresponding shadow status bit. This arrangement causes any update of a status bit to also cause the identical update to the corresponding shadow status bit, i.e., any 1-bit change in a status bit result in two identical 1-bit changes: one to the status bit itself, and another to the shadow status bit. The identical double change retains the same parity as the previously computed parity, i.e., two identical 1-bit changes is not detectable as a change by a single parity bit computing parity using the exclusive OR function. Thus, this embodiment may also be implemented using multiple shadow status bits, as long as each 1-bit change to a status bit results in multiple numbers of identical 1-bit changes such that the multiple number of identical 1-bit changes are not detectable by a parity code. For example, each status bit may also be associated with three shadow status bit, since four identical 1-bit changes cannot be detected by the parity code. However, two shadow status bits would not be workable since three identical 1-bit changes may be detected by a parity code. Thus, in the second embodiment, the controller 120 of a CAM device 100 may freely update the status bit of a CAM entry 200, because the change in status bit is guaranteed not to invalidate previously stored parity information.

PARA0While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed is:

1. A method of operating a content addressable memory (CAM) comprising a plurality of words each including a data portion and a status portion, the method comprising:
 writing a word in said CAM, wherein said writing includes storing with said word, a first code for error detection and a second code for error detection; and
 reading the word from said CAM, wherein said reading includes, using said first and second codes to determine if said read word has been correctly read;
 wherein
 said first code is a data code bit computed over the data portion of the word; and
 said second code is a status code bit computed over the status portion of the word.

2. The method of claim 1, wherein said first code is a parity code.

3. The method of claim 2, wherein said first code is computed as an exclusive OR of each bit in the data portion of the word.

4. The method of claim 1, wherein said second code is a parity code.

5. The method of claim 4, wherein said second code is computed as an exclusive OR of each bit in the status portion of the word.

6. The method of claim 1, further comprising:
 writing updated status to said word, wherein said writing updated status includes storing with said updated status, an updated second code.

7. The method of claim 1, further comprising:
 writing updated data to said word, wherein said writing updated data includes storing with said updated data, an updated first code.

8. The method of claim 7, further comprising:
 storing with said updated data, an updated second code.

9. A method of operating a content addressable memory (CAM) comprising a plurality of words each including a data portion and a status portion, the method comprising:
 writing a word in said CAM, wherein said writing includes storing with said word, a first code for error detection and a second code for error detection; and
 reading the word from said CAM, wherein said reading includes, using said first and second codes to determine if said read word has been correctly read;
 wherein each status bit in said status portion is associated with an odd number of corresponding shadow status bit;
 said second code is the content of the shadow status bits; and
 said first code is computed over the data, status, and shadow status portions of the word.

10. The method of claim 9, wherein said second code maintains, for each status bit, identical content information in its corresponding shadow status bit.

11. The method of claim 10, wherein said number of shadow status bits per status bit is one.

12. The method of claim 9, wherein said first code is a parity code.

13. The method of claim 12, wherein said status portion of the word include every status and shadow status bits, and said first code is computed as an exclusive OR over each bit in the data portion and status portion of the word.

14. A content addressable memory (CAM) device, comprising:
 a plurality of CAM storage locations, each of said plurality of CAM storage locations including, data bit and status bit storage areas and storage areas for storing at least one first error code bit and at least one second error code bit.
 a first error detection code circuit, for generating a first code to be stored in said storage area for storing at least one first code bit; and a second error detection code circuit, for generating a second code to be stored in said storage area for storing at least one second code bit;
wherein said first and second error detection code circuits are coupled to the plurality of CAM storage locations;
said first error detection code circuit generates the first code computed over each data bit of said data storage area; and
said second error detection code circuit generates the second code computed over each status bit of said status storage area and stores said second result in said second code storage area of one of said plurality of CAM storage location.

15. The content addressable memory device of claim 14, wherein said first error detection code circuit is a parity code generation circuit.

16. The content addressable memory device of claim 15, wherein said first error detection code circuit generates an exclusive OR of each data bit in the data storage area portion of a CAM storage location whenever said data storage area is written.

17. The content addressable memory device of claim 14, wherein said second error detection code circuit is a parity code generation circuit.

18. The content addressable memory device of claim 17, wherein said second error detection code circuit generates an exclusive OR of each status bit in the status portion of the CAM storage location whenever said status storage area is written.

19. The content addressable memory device of claim 18, wherein said second error detection code circuit generates an exclusive OR of each status bit in the status portion of the CAM storage location whenever said data storage area is written.

20. A content addressable memory (CAM) device, comprising:
a plurality of CAM storage locations, each of said plurality of CAM storage locations including, data bit and status bit storage areas and storage areas for storing at least one first error code bit and at least one second error code bit.
a first error detection code circuit, for generating a first code to be stored in said storage area for storing at least one first code bit; and
a second error detection code circuit, for generating a second code to be stored in said storage area for storing at least one second code bit;
wherein said first and second error detection code circuits are coupled to the plurality of CAM storage locations;
said status portion further comprises,
a plurality of status bits; and
for each status bit, an odd number of corresponding shadow status bits;
for each one of said plurality of status bits, said second error detection code circuit maintains identical information in the corresponding shadow status bit(s); and
said first error detection code circuit generates a first code computed over each data bit, status bit, and shadow status bit of a CAM storage location and stores said first code in said storage area for storing at least one first error code bit.

21. The content addressable memory device of claim 20, wherein said number of shadow status bits per status bit is one.

22. The content addressable memory device of claim 20, wherein said first error detection code circuit generates a parity code.

23. The content addressable memory device of claim 22, wherein said status portion of each CAM storage location includes every status and shadow status bits in the CAM storage location, and said first code is computed as an exclusive OR over each bit in the data portion and status portion of the word.

24. A system, comprising:
a processor;
a plurality of network interfaces;
a content addressable memory (CAM), comprising:
a plurality of CAM storage locations, each of said plurality of CAM storage locations including, data bit and status bit storage areas and storage areas for storing at least one first error code bit and at least one second error code bit;
a first error detection code circuit, coupled to said plurality of CAM storage locations and for generating a first code to be stored in said storage area for storing at least one first code bit; and
a second error detection code circuit, coupled to said plurality of CAM storage locations and for generating a second code to be stored in said storage area for storing at least one second code bit;
and a bus;
wherein said processor, plurality of network interfaces, and said content addressable memory are each coupled to the bus;
said first error detection code circuit generates the first code computed over each data bit of said data storage area; and
said second error detection code circuit generates the second code computed over each status bit of said status storage area and stores said second result in said second code storage area of one of said plurality of CAM storage location.

25. The system of claim 24, wherein said first error detection code circuit is a parity code generation circuit.

26. The system of claim 25, wherein said first error detection code circuit generates an exclusive OR of each data bit in the data storage area portion of a CAM storage location whenever said data storage area is written.

27. The system device of claim 24, wherein said second error detection code circuit is a parity code generation circuit.

28. The system of claim 27, wherein said second error detection code circuit generates an exclusive OR of each status bit in the status portion of the CAM storage location whenever said status storage area is written.

29. The system of claim 28, wherein said second error detection code circuit generates an exclusive OR of each status bit in the status portion of the CAM storage location whenever said data storage area is written.

30. A system, comprising:
a processor;
a plurality of network interfaces;
a content addressable memory (CAM), comprising:
a plurality of CAM storage locations, each of said plurality of CAM storage locations including, data bit and status bit storage areas and storage areas for storing at least one first error code bit and at least one second error code bit;
a first error detection code circuit, coupled to said plurality of CAM storage locations and for generating a first code to be stored in said storage area for storing at least one first code bit; and
a second error detection code circuit, coupled to said plurality of CAM storage locations and for generating a second code to be stored in said storage area for storing at least one second code bit;
and a bus;
wherein said processor, plurality of network interfaces, and said content addressable memory are each coupled to the bus;
said status portion further comprises,
a plurality of status bits; and
for each status bit, an odd number of corresponding shadow status bits;
for each one of said plurality of status bits, said second error detection code circuit maintains identical information in the corresponding shadow status bit(s); and
said first error detection code circuit generates a first code computed over each data bit, status bit, and shadow status bit of a CAM storage location and stores said first code in said storage area for storing at least one first error code bit.

31. The system of claim 30, wherein said number of shadow status bits per status bit is one.

32. The system of claim 30, wherein said first error detection code circuit generates a parity code.

33. The system of claim 32, wherein said status portion of each CAM storage location includes every status and shadow status bits in the CAM storage location, and said first code is computed as an exclusive OR over each bit in the data portion and status portion of the word.

34. A content addressable memory, comprising:
a plurality of storage locations, each storage location including,
a data storage area,
a status storage area,
at least one data error detection bit, and
at least one status error detection bit;
wherein said at least one data error detection bit stores a first error detection code computed over said data storage area, and said at least one status error detection bit stores a second error detection code computed over with said status storage area.

35. A system, comprising:
a processor;
a content addressable memory; and
a bus coupled to said processor and content addressable memory;
wherein said content addressable memory further comprises,
a plurality of storage locations, each storage location including,
a data storage area,
a status storage area,
at least one data error detection bit, and
at least one status error detection bit;
wherein said at least one data error detection bit stores a first error detection code computed over said data storage area, and said at least one status error detection bit stores a second error detection code computed over with said status storage area.

36. A content addressable memory, comprising:
a plurality of storage locations, each storage location including,
a data storage area,
a status storage area, wherein said status storage area includes at least one status bit and a corresponding shadow status bit, and
at least one error detection bit, computed over said data storage area and said status storage area, and wherein each shadow status bit maintains a copy of a content of its corresponding status bit.

* * * * *

UNITED STATES PATENT AND TRADEMARK OFFICE
CERTIFICATE OF CORRECTION

PATENT NO. : 6,993,623 B2
APPLICATION NO. : 10/325739
DATED : January 31, 2006
INVENTOR(S) : Alon Regev et al.

It is certified that error appears in the above-identified patent and that said Letters Patent is hereby corrected as shown below:

Column 2,
Line 47, "causes" should read -- cause --;

Column 3,
Line 46, "from the one" should read -- from one --;

Column 4,
Line 17, "inputs the each" should read -- inputs each --;
Line 17, "enables" should read -- enable --;
Line 23, "cell is would" should read -- cell would --;
Line 61, "either write" should read -- either of the write --;
Line 62, "terminals" should read -- terminal --;
Line 62, "are" should read -- is --;

Column 5,
Lines 4, 23 and 50, "PARA0" should be deleted;
Line 41, "bit" should read -- bits --;

Column 6,
Line 55, "include" should read -- includes --;
Line 55, "bits" should read -- bit --;

Column 7,
Line 13, "location" should read -- locations --;

Column 8,
Line 3, "bits" should read -- bit --;
Line 35, "location" should read -- locations --; and

UNITED STATES PATENT AND TRADEMARK OFFICE
CERTIFICATE OF CORRECTION

| | | |
|---|---|---|
| PATENT NO. | : 6,993,623 B2 | |
| APPLICATION NO. | : 10/325739 | |
| DATED | : January 31, 2006 | |
| INVENTOR(S) | : Alon Regev et al. | |

It is certified that error appears in the above-identified patent and that said Letters Patent is hereby corrected as shown below:

<u>Column 9,</u>
Line 25, "bits" should read -- bit --.

Signed and Sealed this

Twenty-seventh Day of June, 2006

JON W. DUDAS
*Director of the United States Patent and Trademark Office*